United States Patent
Sakamoto et al.

(10) Patent No.: US 7,153,355 B2
(45) Date of Patent: Dec. 26, 2006

(54) COATING SOLUTION FOR FORMING SILICA FILM

(75) Inventors: Yoshinori Sakamoto, Kanagawa (JP); Naoki Yamashita, Kanagawa (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 159 days.

(21) Appl. No.: 10/964,276

(22) Filed: Oct. 13, 2004

(65) Prior Publication Data

US 2005/0092206 A1      May 5, 2005

(30) Foreign Application Priority Data

Nov. 5, 2003    (JP) ................. P. 2003-375775

(51) Int. Cl.
*C09D 183/04* (2006.01)
*H01L 21/473* (2006.01)

(52) U.S. Cl. ................. 106/287.14; 438/780; 438/790

(58) Field of Classification Search ........... 106/287.14; 438/780, 790
See application file for complete search history.

(56) References Cited

U.S. PATENT DOCUMENTS

| | | | |
|---|---|---|---|
| 6,214,104 B1 * | 4/2001 | Iida et al. ............. | 106/287.13 |
| 6,471,761 B1 * | 10/2002 | Fan et al. ............. | 106/287.16 |
| 6,576,568 B1 * | 6/2003 | Mandal et al. ........... | 438/781 |
| 6,896,955 B1 * | 5/2005 | Mandal et al. .......... | 428/312.6 |
| 2002/0020327 A1 * | 2/2002 | Hayashi et al. ........ | 106/287.12 |
| 2002/0042210 A1 | 4/2002 | Mandal et al. | |
| 2002/0086166 A1 | 7/2002 | Hendricks et al. | |
| 2006/0009575 A1 * | 1/2006 | Nakashima ............ | 524/837 |

FOREIGN PATENT DOCUMENTS

| | | |
|---|---|---|
| JP | 6-263435 | 9/1994 |
| JP | 200226003 | 1/2002 |
| JP | 2004161875 | 6/2004 |

OTHER PUBLICATIONS

Takamaro Kikkawa et al., Nikkei Microdevices, Feb. 2003 p. 123-132.
Taiwanese Office Action issued Jul. 27, 2006 (w/English Translation).

* cited by examiner

*Primary Examiner*—David M. Brunsman
(74) *Attorney, Agent, or Firm*—Fish & Richardson P.C.

(57) ABSTRACT

To provide a silica film-forming material having a low dielectric constant and giving a film of less undergoing change in aging, a coating solution for forming a silica film includes a hydrolysis product of a mixture comprising: a tetraalkoxysilane; and at least one of a monoalkyltrialkoxysilane and a dialkyldialkoxysilane, and an ammonium salt represented by formula (I):

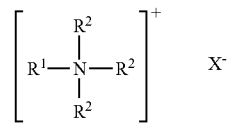

wherein $R^1$ represents an alkyl group having from 6 to 30 carbon atoms, $R^2$ represents an alkyl group having from 1 to 5 carbon atoms, and X represents $CH_3COO$, $SO_3H$ or $OH$.

11 Claims, No Drawings

COATING SOLUTION FOR FORMING SILICA FILM

BACKGROUND OF THE INVENTION

1. Field of the Invention

The present invention relates to a coating solution for forming a silica film.

2. Background Art

Along with recent requirements for miniaturization of semiconductor devices and high-speed processing of electric signals, reduction in the wiring delay is demanded. From the standpoint of decreasing the wiring resistance, there is a movement of shifting the wiring material from conventional aluminum to copper. Also, from the standpoint of decreasing the wiring capacity, reduction in the dielectric constant of interlayer insulating film is demanded.

With respect to the interlayer insulating film material having a low dielectric constant, various materials have been proposed. For example, there are known CVD materials such as P-TEOS (plasma tetraethoxysilane), SiOF and SiOC, and coating materials (SOD materials) including inorganic SOG (silicon on glass) materials such as HSQ (hydrogensilsesquioxane) and porous HSQ; organic SOG materials such as MSQ (methylsilsesquioxane); porous MSQ; and organic polymer-based materials such as polyarylene ether (PAE). These interlayer insulating film materials have achieved a dielectric constant on the order of 1.8 to 4.1. In particular, low dielectric constant materials (low-K materials) having a dielectric constant of less than 4 are drawing attention as a material suitable for multilayer interconnection techniques using a fine copper wiring.

As for the technique of more reducing the dielectric constant of interlayer insulating film, for example, a method of rendering the film porous has been proposed. However, when the film becomes porous, the hygroscopicity of film is elevated and the dielectric constant of film tends to increase in aging, giving rise to poor aging stability. Furthermore, as the film becomes porous, the mechanical strength of film is deteriorated and this causes a problem such as generation of cracking in the CMP (chemical mechanical polishing) process or the like. As for the material capable of achieving reduction in the dielectric constant, a silica film-forming material having added thereto a surfactant having directing property and an ammonium salt has been proposed (see, JP-A-2002-26003 (the term "JP-A" as used herein means an "unexamined published Japanese patent application")). However, this coating solution is not acid-controlled and therefore, improvement in storage stability of the coating solution is being demanded. As for the material capable of realizing reduction in the dielectric constant and increase in the mechanical strength, a silica film-forming material obtained by adding an ammonium salt having orienting property to a coating solution using a tetraalkoxysilane as the basic ingredient has been proposed (see, Takamaro Kikkawa, et al., *Nikkei Microdevices*, pp. 123–132 (February, 2003)). However, when only a tetraalkoxysilane is used as the basic ingredient, the obtained film tends to have high water adsorptivity and this causes a problem that the dielectric constant of film is elevated in aging. Furthermore, the halogen ion used as the counter ion of the ammonium salt, such as chloride ion and bromide ion, may corrode a metal and this disadvantageously disturbs the application to semiconductor devices.

Under these circumstances, a silica film-forming material having a low dielectric constant and giving a film of less undergoing change in aging is being demanded. Also, a silica film-forming material having good storage stability in addition to those properties is being demanded.

SUMMARY OF THE INVENTION

The present invention provides a coating solution for forming a silica film, which comprises: a hydrolysis product of a mixture comprising: a tetraalkoxysilane; and at least one of a monoalkyltrialkoxysilane and a dialkyldialkoxysilane, and an ammonium salt represented by formula (I):

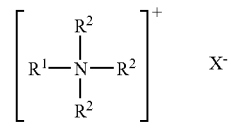

wherein $R^1$ represents an alkyl group having from 6 to 30 carbon atoms, $R^2$ represents an alkyl group having from 1 to 5 carbon atoms, and X represents $CH_3COO$, $SO_3H$ or $OH$.

According to the silica film-forming coating solution of the present invention, a silica film having a low dielectric constant and less undergoing change in aging can be formed.

DETAILED DESCRIPTION OF THE INVENTION

As a result of intensive investigations, the present inventors have found that the above-described problems can be solved by a coating solution for forming a silica film, which comprising a predetermined hydrolysis product of an alkoxysilane and a predetermined ammonium salt. The present invention is described in detail below.

(Hydrolysis Product of Alkoxysilane)

The hydrolysis product of alkoxysilane, which can be used, is, for example, a condensate obtained by hydrolyzing an alkoxysilane in an organic solvent in the presence of an acid catalyst, the alkoxysilane being selected from alkoxysilanes represented by formula (II):

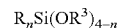

wherein R is an alkyl group having from 1 to 4 carbon atoms or an aryl group, $R^3$ is an alkyl group having from 1 to 4 carbon atoms, and n is an integer of 0 to 2.

Specific examples of the alkoxysilane represented by formula (II) include the followings:
  (i) when n=0, tetraalkoxysilanes such as tetramethoxysilane, tetraethoxysilane, tetrapropoxysilane and tetrabutoxysilane;
  (ii) when n=1, monoalkyltrialkoxysilanes such as monomethyltrimethoxysilane, monomethyltriethoxysilane, monomethyltripropoxysilane, monoethyltrimethoxysilane, monoethyltriethoxysilane, monoethyltripropoxysilane, monopropyltrimethoxysilane, monopropyltriethoxysilane; and monophenyltrialkoxysilanes such as monophenyltrimethoxysilane and monophenyltriethoxysilane; and
  (iii) when n=2, dialkyldialkoxysilanes such as dimethyldimethoxysilane, dimethyldiethoxysilane, dimethyldipropoxysilane, diethyldimethoxysilane, diethyldiethoxysilane, diethyldipropoxysilane, dipropyldimethoxysilane, dipropyldiethoxysilane and dipropyldipropoxysilane; and diphenyldialkoxysilanes such as diphenyldimethoxysilane and diphenyldiethoxysilane.

From the alkoxysilanes in each group (i), (ii) or (iii), one member or two or more members may be selected and used.

In view of excellent stability of film in aging, a hydrolysis product of an alkoxysilane of (i) and at least one of an alkoxysilane of (ii) and an alkoxysilane of (iii) is preferably contained. The ratio of the alkoxysilane of (i) to the at least one of the alkoxysilane of (ii) and the alkoxysilane of (iii) is not limited, and the proportion of the alkoxysilane of (i) to total amount of alkoxysilane is preferably 1 to 99% by mol.

Also, a hydrolysis product of a tetraalkoxysilane and at least one of a monoalkyltrialkoxysilane and a dialkyldialkoxysilane is preferably contained. A hydrolysis product of a mixture comprising a tetraalkoxysilane and a monoalkyltrialkoxysilane is more preferred.

A first reason why the stability of film in aging is enhanced is considered because the Si—R group in the monoalkyltrialkoxysilane or dialkyldialkoxysilane has high hydrophobicity and this prevents the film from absorbing moisture in air. A second reason is considered because the above-described hydrophobic group is burned out during film formation and the film becomes porous, as a result, the absolute amount of Si—OH group or Si—OR group on the film surface decreases and the film is freed from water absorption. Incidentally, within the range inferable based on these reasons, an alkoxysilane other than the alkoxysilanes described above can be used.

The low dielectric constant may be realized by forming a porous film or introducing an organic group having a low polarizability. In this point, a monoalkyltrialkoxysilane or dialkyldialkoxysilane having a Si—R group is preferred because the formation of a porous film and the introduction of an organic group both can be achieved. Also, the tetraalkoxysilane is a material having high hygroscopicity and therefore, when a monoalkyltrialkoxysilane or dialkyldialkoxysilane having a hydrophobic group is blended, this is preferred in that the storage stability of the coating solution is enhanced.

The hydrolysate of alkoxysilane may be a complete hydrolysate or a partial hydrolysate. The degree of hydrolysis can be adjusted by the amount of water added. The amount of water added may be appropriately adjusted according to the properties of the objective organic SOG film. In general, water is preferably reacted in an amount of from 2.0 to 20.0 mol, more preferably from 3.0 to 12.0 mol, with respect to 1 mol in total of alkoxysilane compounds, in view of film formation and storage stability. When the amount of water added is within this range, the degree of hydrolysis is high to readily prevent gelling.

The acid catalyst may be either an organic acid or an inorganic acid, which are heretofore commonly used. Examples of the organic acid include organic carboxylic acids such as acetic acid, propionic acid and butyric acid. Examples of the inorganic acid include inorganic acids such as hydrochloric acid, nitric acid, sulfuric acid and phosphoric acid.

In this case, the acid catalyst is added to give an acid concentration of 1 to 1,000 ppm by weight, preferably from 5 to 500 ppm by weight, in the reaction solution. Examples of the method for adding the acid catalyst include a method of adding the acid catalyst directly to the reaction solution and a method of mixing the acid catalyst with water added, adding the mixture as an aqueous acid solution, and causing a hydrolysis.

The hydrolysis reaction is usually completed in approximately from 5 to 100 hours. The reaction can also be completed within a short reaction time by adding dropwise the aqueous acid catalyst solution to an organic solvent containing an alkoxysilane compound under heating at a temperature from room temperature to 80° C. to cause the reaction. The alkoxysilane compound hydrolyzed in this way undergoes a condensation reaction, whereby the film-forming ability is exhibited.

(Ammonium Salt)

The ammonium salt for use in the present invention may be an ammonium salt capable of forming a film having a mesoporous structure with low hygroscopicity and excellent mechanical strength.

The quaternary ammonium salt as the ammonium salt is stably present in the form of molecular aggregates having very uniform size or shape in an aqueous solution. These aggregates further self-organize liquid crystal phases spatially aligned in regular orientation according to the conditions. That is, by using the above-described molecular aggregates as a highly regulated nm-order template, a ceramic (silica film) having a fine pore structure with extremely high regularity can be synthesized. In view of this point, the ammonium salt is preferably a quaternary ammonium salt.

From the standpoint of controlling the hole diameter or preventing corrosion of the metal layer (wiring), the quaternary ammonium salt which can be used is, for example, an ammonium salt represented by the following formula (I):

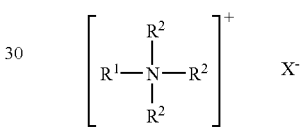

wherein $R^1$ represents an alkyl group having from 6 to 30 carbon atoms, $R^2$ represents an alkyl group having from 1 to 5 carbon atoms, and X represents $CH_3COO$, $SO_3H$ or $OH$. In formula (I), X is preferably $CH_3COO$. Specifically, the ammonium salt is preferably lauryltrimethylammonium acetate.

Also, the ammonium salt is preferably ammonium salt having a thermal decomposition temperature of 200 to 300° C. When the thermal decomposition temperature is 200° C. or more, a porous film can be easily formed in the film formation step, and when the thermal decomposition temperature is 300° C. or less, the amount of ammonium salt remaining in the film after burning decreases and the dielectric constant of film becomes low The counter ion of the ammonium ion is preferably an acetate. The ammonium salt represented by formula (I) is preferably an ammonium salt where $R^1$ is an alkyl group having approximately from 8 to 15 carbon atoms and $R^2$ is an alkyl group having approximately from 1 to 3 carbon atoms. In particular, lauryltrimethylammonium acetate is preferred.

The ammonium salt is preferably blended in the range from 20 to 150 parts by weight per 100 parts by weight of the hydrolysis product in view of obtaining a good film having a low dielectric constant.

Examples of the method for blending the ammonium salt include (1) a method of blending the ammonium salt in a solution containing the hydrolysis product and (2) a method of blending the ammonium salt in a solution comprising the acid catalyst, water and a reaction solvent, adding an alkoxysilane thereto, and performing hydrolysis and polycondensation.

The coating solution obtained is preferably acidic because the storage stability of the coating solution is enhanced. For this purpose, an appropriate acid component is preferably blended to adjust the pH to the range from 2 to 4. The adjustment of pH can be performed by a conventionally known method. Examples of the acid component for use in the adjustment of pH include the above-described organic acids and inorganic acids. Among these, nitric acid is preferred because of its good handleability.

(Others)

The organic solvent may be an organic solvent which is heretofore commonly used. Examples thereof include monohydric alcohols such as methyl alcohol, ethyl alcohol, propyl alcohol and butyl alcohol; polyhydric alcohols such as ethylene glycol, diethylene glycol and propylene glycol; polyhydric alcohol derivatives such as ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, ethylene glycol monomethyl ether acetate, ethylene glycol monoethyl ether acetate, propylene glycol monomethyl ether acetate and propylene glycol monoethyl ether acetate; and fatty acids such as acetic acid and propionic acid. These organic solvents may be used individually or in combination of two or more thereof. The amount of the organic solvent used is from 10 to 30 molar times per mol of alkoxysilane.

(Production Process)

The embodiment of the process for producing the silica film-forming coating solution of the present invention is described.

Pure water and an ammonium salt are blended and dissolved in a reaction solution and thereto, an acid component is blended and stirred to prepare a solution. After blending an alkoxysilane to this solution, hydrolysis and polycondensation reactions are performed at a temperature of approximately from 10 to 30° C. The resulting reaction solution is left standing at room temperature for 2 days, whereby the coating solution is prepared. In another preparation process, an acid component and an ammonium salt each in a predetermined amount are blended in an organic solvent solution having dissolved therein a hydrolysis product of alkoxysilane.

(Use Method and Usage)

By using the silica film-forming coating solution of the present invention, a silica film can be formed. In this case, the silica film is formed, for example, by a method of applying the coating solution on a substrate such as semiconductor substrate, glass substrate, metal plate or ceramic substrate, according to a spinner method, a roll coater method, a dip and pull-up method, a spray method, a screen printing method, a brush painting method or the like, then drying it to dissipate the solvent, and baking the formed coating film at a temperature of 250 to 500° C.

According to the silica film-forming coating solution of the present invention above-described, a film having a dielectric constant of maximally 3, particularly a low dielectric constant of approximately from 1.5 to 2.5, can be formed. Also, a silica film free of change in aging can be formed. Furthermore, the silica film-forming coating solution of the present invention has good storage stability in addition to those effects and further has an effect of not causing metal corrosion. Therefore, the silica film-forming coating solution of the present invention can be suitably used for an interlayer insulating film in the multilayer interconnection portion using a metal wiring.

In the present invention, the "dielectric constant of a film" formed by using the silica film-forming coating solution means, as described in greater detail in Examples, a dielectric constant of a film obtained by spin-coating the silica film-forming coating solution on an N-type Si substrate, heating it on a hot plate at 80° C., 150° C. and 200° C. each for 1 minute and finally baking the formed coating film at 350° C. in an $N_2$ atmosphere.

According to the silica film-forming coating solution of the present invention, a low hygroscopic film can be formed. Therefore, the silica film-forming coating solution of the present invention can be suitably used particularly as an interlayer insulating film-forming material required to be low-K for use in multilayer interconnection techniques using a copper damascene process. By virtue of an ammonium salt blended, an oriented porous state can be realized and therefore, the film can have excellent mechanical strength.

The present invention is described in greater detail by referring to Examples and Comparative Examples, but the present invention is of course not limited to the following Examples.

EXAMPLE 1

Pure water (3 g) and 2 g of lauryltrimethylammonium acetate were blended and dissolved in 21 g of butanol and thereto, 200 μl of nitric acid was added. After blending 1.9 g (0.0125 mol) of tetramethoxysilane and 1.7 g (0.0125 mol) of monomethyltrimethoxysilane to this solution, hydrolysis and polycondensation reactions were performed at room temperature for 3 hours. The resulting reaction solution was left standing at room temperature for 2 days to obtain a silica film-forming coating solution having a pH of 3 and a solid concentration in terms of $SiO_2$ of 5.0 weight %.

EXAMPLE 2

Nitric acid (200 μl) was added to 28 g of an organic SOG material (OCD T-7 7000-WK80, product name, produced by Tokyo Ohka Kogyo Co., Ltd.) containing a hydrolysis product of tetramethoxysilane/monomethyltrimethoxysilane=1/1 (by mol). Subsequently, 2 g of lauryltrimethylammonium acetate was blended and dissolved to obtain a silica film-forming coating solution having a pH of 3 and a solid concentration in terms of $SiO_2$ of 6.5 weight %.

EXAMPLE 3

A silica film-forming coating solution having a pH of 3 and a solid concentration in terms of $SiO_2$ of 6.5 weight % was obtained in the same manner as in Example 2 except that lauryltrimethylammonium acetate used in Example 2 was replaced by lauryltrimethylammonium hydrogensulfate.

COMPARATIVE EXAMPLE 1

A silica film-forming coating solution having a pH of 3 and a solid concentration in terms of $SiO_2$ of 5.1 weight % was obtained in the same manner as in Example 1 except that 0.0125 mol of tetramethoxysilane used in Example 1 was replaced by 0.0125 mol of monomethyltrimethoxysilane.

COMPARATIVE EXAMPLE 2

A silica film-forming coating solution having a pH of 3 and a solid concentration in terms of $SiO_2$ of 5.0 weight % was obtained in the same manner as in Example 1 except that 0.0125 mol of methyltrimethoxysilane used in Example 1 was replaced by 0.0125 mol of tetramethoxysilane.

COMPARATIVE EXAMPLE 3

It was attempted to prepare a silica film-forming coating solution in the same manner as in Example 1 except for not blending nitric acid in Example 1, but after blending tetramethoxysilane and monomethyltrimethoxysilane, the solution was gelled and a coating solution could not be prepared.

COMPARATIVE EXAMPLE 4

It was attempted to prepare a silica film-forming coating solution in the same manner as in Example 3 except for not blending nitric acid in Example 2, but after blending lauryltrimethylammonium acetate, the solution was gelled and a coating solution could not be prepared.

EVALUATION (Formation of Film)

Silica film-forming coating solutions synthesized in Examples 1 to 3 and Comparative Examples 1 and 2 each was coated on a silicon wafer by a spin coating method and the coating was heat-treated at 80° C. for 1 minute on a hot plate in air, thereafter heat-treated at 150° C. for 1 minute and then at 200° C. for 1 minute, and further heat-treated at 350° C. for 30 minutes in a nitrogen atmosphere to form a film having a film thickness of 200 nm.

The obtained film was subjected to evaluation of storage stability, evaluation of dielectric constant and evaluation of aging stability of film according to the following criteria.

(Evaluation of Storage Stability)

In Examples and Comparative Examples, the coating solution was rated "B" when gelled after standing at room temperature for 2 days, and rated "A" when not gelled.

(Evaluation of Dielectric Constant)

The dielectric constant of the film obtained was measured by using a dielectric constant measuring apparatus ("SSM495", product name, manufactured by SSM Japan).

(Evaluation of Aging Stability of Film)

After the film formed was left standing for 7 days, the dielectric constant of the film was measured by using a dielectric constant measuring apparatus ("SSM495", product name, manufactured by SSM Japan).

The evaluation results are shown in Table 1.

TABLE 1

|  | Storage Stability | Evaluation of Dielectric Constant | Evaluation of Aging Stability of Film |
|---|---|---|---|
| Example 1 | A | 1.8 | 1.8 |
| Example 2 | A | 1.8 | 1.8 |
| Example 3 | A | 2.2 | 2.2 |
| Comparative Example 1 | A | —*1 | —*1 |
| Comparative Example 2 | A | 8.0 | —*1 |

Remarks
*1Could not be measured due to clouding of film.
A: Not gelled.

As seen from these test results, a film having a low dielectric constant can be obtained when the film is formed by using a silica film-forming material where a specific hydrolysis product of alkoxysilane is blended with a specific ammonium salt. It is also seen that the storage stability is enhanced by controlling the pH of the silica film-forming material to fall in a predetermined range.

Incidentally, the film of Example 3 had a high dielectric constant as compared with the film of Example 2. Although the reason therefor is not clearly known, this is considered to result because an ammonium salt was slightly remaining in the film due to use of lauryltrimethylammonium hydrogensulfate having a higher decomposition temperature than lauryltrimethylammonium acetate.

In Comparative Example 2 where an alkyl group was not contained, it is considered that the film adsorbed moisture in air due to strong hydrophilic property, as a result, the dielectric constant was increased.

In Comparative Examples 3 and 4 where the coating solution was alkaline, it is considered that the stability of solution was impaired and a gelling phenomenon was caused.

The present application claims foreign priority based on Japanese Patent Application No. JP2003-375775 filed Nov. 5 of 2003, the contents of which is incorporated herein by reference.

What is claimed is:

1. A coating solution for forming a silica film, which comprises:

a hydrolysis product of a mixture comprising: a tetraalkoxysilane; and at least one of a monoalkyltrialkoxysilane and a dialkyldialkoxysilane, and an ammonium salt represented by formula (I):

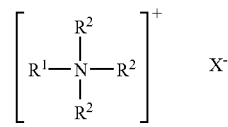

wherein $R^1$ represents an alkyl group having from 6 to 30 carbon atoms, $R^2$'s each independetly represents an alkyl group having from 1 to 5 carbon atoms, and X represents $CH_3COO$, $SO_3H$ or $OH$.

2. The coating solution for forming the silica film according to claim 1, wherein the mixture is a mixture comprising: a tetraalkoxysilane; and a monoalkyltrialkoxysilane.

3. The coating solution for forming the silica film according to claim 1, which has a pH of less than 7.

4. The coating solution for forming the silica film according to claim 3, which has a pH of from 2 to 4.

5. The coating solution for forming the silica film according to claim 1, wherein the ammonium salt has a thermal decomposition temperature of from 200 to 300° C.

6. The coating solution for forming the silica film according to claim 1, wherein X in formula (I) is $CH_3COO$.

7. The coating solution for forming the silica film according to claim 1, wherein the ammonium salt is a lauryltrimethylammonium acetate.

8. The coating solution for forming the silica film according to claim 1, which has the ammonium salt of from 20 to 150 parts by weight per 100 parts by weight of the hydrolysis product.

9. The coating solution for forming the silica film according to claim 1, wherein the silicate film has a dielectric constant of 3 or less.

10. The coating solution for forming the silica film according to claim 1, wherein the alkoxysilane reacts with water in an amount of from 2.0 to 20.0 mol with respect to 1 mol in total of the alkoxysilane, so as to form the hydrolysis product of the alkoxysilane.

11. The coating solution for forming the silica film according to claim 1, the hydrolysis product is an acid hydrolysis product.

* * * * *